(12) United States Patent
Hawksley

(10) Patent No.: US 12,330,959 B2
(45) Date of Patent: Jun. 17, 2025

(54) REGENERATIVE MEDIA FILTER AIR SCOURING APPARATUS AND METHOD

(71) Applicant: Neptune Benson Inc., Coventry, RI (US)

(72) Inventor: Steven Hawksley, Warwick, RI (US)

(73) Assignee: Neptune Benson, Inc., Coventry, RI (US)

(*) Notice: Subject to any disclaimer, the term of this patent is extended or adjusted under 35 U.S.C. 154(b) by 662 days.

(21) Appl. No.: 17/434,002

(22) PCT Filed: Nov. 20, 2019

(86) PCT No.: PCT/US2019/062373
§ 371 (c)(1),
(2) Date: Feb. 18, 2022

(87) PCT Pub. No.: WO2020/176151
PCT Pub. Date: Sep. 3, 2020

(65) Prior Publication Data
US 2023/0052718 A1 Feb. 16, 2023

Related U.S. Application Data

(60) Provisional application No. 62/810,008, filed on Feb. 25, 2019.

(51) Int. Cl.
C02F 1/00 (2023.01)
B01D 24/04 (2006.01)
(Continued)

(52) U.S. Cl.
CPC ............ C02F 1/004 (2013.01); B01D 24/047 (2013.01); B01D 24/167 (2013.01);
(Continued)

(58) Field of Classification Search
CPC ........ C02F 1/001; C02F 9/00; C02F 2303/16; C02F 1/004; C02F 1/008; C02F 2103/42;
(Continued)

(56) References Cited

U.S. PATENT DOCUMENTS

| | | | |
|---|---|---|---|
| 4,547,286 A | 10/1985 | Hsiung | |
| 4,652,369 A * | 3/1987 | DePolo | B01D 29/21 210/356 |

(Continued)

FOREIGN PATENT DOCUMENTS

| | | |
|---|---|---|
| WO | 2019055903 A1 | 3/2019 |
| WO | 2020159589 A1 | 8/2020 |

OTHER PUBLICATIONS

International Search Report in corresponding PCT/US2019/062373, dated Mar. 23, 2020.

*Primary Examiner* — Magali P Slawski
*Assistant Examiner* — Bernadette Karen McGann

(57) ABSTRACT

A water filtration system is also disclosed. The water filtration system includes a regenerative media filter vessel, a filtrate line, a feed line, a recirculation line, a gas line, and at least one pump. A method of filtering water in a system comprising a regenerative media filter is disclosed. The method includes operating the system in a filtration mode, operating the system in a cleaning mode responsive to a differential pressure measurement across the regenerative media filter, operating the system in an aeration mode, operating the system in a pre-filtration mode after operating the system in the cleaning mode, operating the system in a drain mode, and operating the system in the filtration mode following the drain mode. A controller and non-transitory computer-readable medium having computer-readable signals stored thereon that define instructions that, as a result of being executed by the controller, instruct the controller to (Continued)

perform a method of operating a water filtration system are disclosed.

22 Claims, 7 Drawing Sheets

(51) Int. Cl.
| | |
|---|---|
| B01D 24/16 | (2006.01) |
| B01D 24/46 | (2006.01) |
| B01D 29/15 | (2006.01) |
| B01D 29/52 | (2006.01) |
| B01D 29/60 | (2006.01) |
| B01D 29/64 | (2006.01) |
| B01D 29/72 | (2006.01) |
| C02F 103/42 | (2006.01) |

(52) U.S. Cl.
CPC ......... *B01D 24/4621* (2013.01); *B01D 29/15* (2013.01); *B01D 29/52* (2013.01); *B01D 29/606* (2013.01); *B01D 29/6438* (2013.01); *B01D 29/72* (2013.01); *C02F 1/008* (2013.01); *B01D 2201/0446* (2013.01); *B01D 2201/54* (2013.01); *C02F 2103/42* (2013.01); *C02F 2209/03* (2013.01); *C02F 2303/16* (2013.01)

(58) Field of Classification Search
CPC ............ C02F 2209/03; C02F 2209/005; C02F 2301/046; B01D 24/047; B01D 24/167; B01D 24/4621; B01D 29/15; B01D 29/52; B01D 29/606; B01D 29/6438; B01D 29/72; B01D 2201/0446; B01D 2201/54; B01D 24/165; B01D 24/183; B01D 24/186; B01D 24/46; B01D 24/4605; B01D 29/64; B01D 29/6423; B01D 210/269; B01D 210/791; B01D 210/797; B01D 210/274; Y02W 10/10
See application file for complete search history.

(56) References Cited

U.S. PATENT DOCUMENTS

| | | |
|---|---|---|
| 5,143,530 A | 9/1992 | Haldipur et al. |
| 2005/0133432 A1 | 6/2005 | Martin |
| 2010/0000941 A1 | 1/2010 | Muller |
| 2010/0237014 A1* | 9/2010 | Pedersen ............... B01D 65/08 210/197 |
| 2012/0199536 A1* | 8/2012 | Dennis ................... C02F 1/004 210/275 |
| 2016/0280568 A1* | 9/2016 | Wilson ................. C02F 1/4691 |

* cited by examiner

REGENERATIVE MEDIA FILTER AIR SCOURING APPARATUS AND METHOD

CROSS-REFERENCE TO RELATED APPLICATIONS

This application claims priority under 35 U.S.C. § 119(e) to U.S. Provisional Application Ser. No. 62/810,008, titled "Regenerative Media Filter. Air Scouring Apparatus and Method" filed Feb. 25, 2019, which is incorporated herein by reference in its entirety for all purposes.

FIELD OF TECHNOLOGY

Aspects and embodiments disclosed herein are generally directed to water treatment systems, and more specifically, to water treatment systems for use in aquatics or recreational facilities and methods of operating same.

SUMMARY

In accordance with one aspect, there is provided a water filtration system. The water filtration system may comprise a regenerative media filter vessel having a first inlet fluidly connectable to a feed source comprising water to be filtered, a first outlet fluidly connectable to an end use configured to receive filtered water, a second inlet fluidly connectable to a first source of gas, and a second outlet fluidly connectable to a drain. The regenerative media filter vessel may house a tube sheet comprising a plurality of tube elements, a gas distributor fluidly connected to the second inlet, the gas distributor positioned below the plurality of tube elements, and particulate media. The water filtration system may further comprise a filtrate line having an inlet fluidly connectable to the first outlet of the regenerative media filter vessel and an outlet fluidly connected to the end use. The water filtration system may further comprise a feed line having an inlet fluidly connectable to the feed source and an outlet fluidly connected to the first inlet of the regenerative media filter vessel. The water filtration system may further comprise a gas line having an inlet fluidly connectable to the first source of gas and an outlet fluidly connected to the second inlet of the regenerative media filter vessel. The water filtration system may further comprise at least one pump configured to direct the water through the water filtration system.

In further embodiments, the water treatment system may comprise an inflatable bladder having an inlet connectable to a second source of gas, the inflatable bladder operatively connected to the tube sheet and configured to mechanically agitate the tube sheet within the regenerative media filter vessel upon inflation and deflation. In some embodiments, the first source of gas and the second source of gas are the same.

The water filtration system may comprise a recirculation line having an inlet and an outlet fluidly connected to the regenerative media filter vessel.

The water filtration system may comprise a pressure sensor subsystem comprising an inlet pressure sensor and an outlet pressure sensor. The pressure sensor subsystem may be configured to measure a differential pressure across the regenerative media filter vessel. The water filtration system may comprise an end use valve positioned on the filtrate line and configured to allow passage of the filtered water to the end use. The water filtration system may comprise a feed valve positioned on the feed line and configured to allow passage of the water to the regenerative media filter vessel.

The water filtration system may comprise a first gas valve positioned on the gas line and configured to allow passage of gas to the gas distributor. The water filtration system may comprise a second gas valve positioned on the gas line and configured to allow passage of gas to the inflatable bladder. The water filtration system may comprise at least one recirculation valve positioned on the recirculation line and configured to allow passage of at least one of the water to be filtered and the filtered water through the recirculation line.

The water filtration system may comprise a controller operably connected to the pressure sensor subsystem, the end use valve, the feed valve, the first gas valve, the second gas valve, and the at least one recirculation valve. The controller may be configured to direct the water through the regenerative media filter vessel in a first direction for operation in a filtration mode for a first period of time until the pressure sensor subsystem measures the differential pressure in a first predetermined differential pressure range associated with deteriorated operation of the regenerative media filter vessel. The controller may be configured to inflate and deflate the inflatable bladder to force water into the regenerative media filter vessel in a cleaning mode responsive to the pressure sensor measuring the differential pressure in the first predetermined differential pressure range for a predetermined number of inflation-deflation cycles sufficient to decrease the differential pressure to be within a second predetermined differential pressure range associated with restored operation of the regenerative media filter vessel. The controller may be configured to direct the filtered water through the regenerative media filter vessel in a second direction, opposite the first direction, for reverse recirculation in a cleaning mode responsive to the pressure sensor measuring the differential pressure in the first predetermined differential pressure range for a second period of time sufficient to decrease the differential pressure to be within a second predetermined differential pressure range associated with restored operation of the regenerative media filter vessel. The controller may be configured to direct an effective volume of gas from the first source of gas to the gas distributor to produce a plurality of bubbles in an aeration mode responsive to the pressure sensor measuring the differential pressure in the first differential pressure range.

In some embodiments, the bubbles are generated following the predetermined number of inflation-deflation cycles. In some embodiments, the bubbles are generated following the reverse recirculation. In some embodiments, the first predetermined differential pressure range is between about 10 psi and about 15 psi. The second predetermined differential pressure range may be between about 7 psi and about 12 psi. In some embodiments, the effective volume of gas delivered to the gas distributor is a continuous flow. In certain embodiments, the effective volume of gas delivered to the gas distributor is a pulsed flow. The pulsed flow may be random in magnitude, frequency, and/or duration. In some embodiments, the gas distributor is configured to produce symmetric bubbles. In some embodiments, the gas distributor is configured to produce asymmetric bubbles.

In accordance with one aspect, there is provided a method of filtering water in a system comprising a regenerative media filter. The method may comprise operating the system in a filtration mode for a first period of time by directing water to be filtered through the regenerative media filter in a first direction to filter the water by contact with a particulate media attached to a plurality of tube elements for a first period of time to produce filtered water until a differential pressure across the regenerative media filter is within a first predetermined differential pressure range associated with deteriorated operation of the regenerative media filter. The method may comprise operating the system in a cleaning mode responsive to the differential pressure being within the first predetermined differential pressure range for a second period of time sufficient to decrease the differential pressure across the regenerative media filter to be within a second predetermined differential pressure range associated with restored operation of the regenerative media filter. The method may comprise operating the system in an aeration mode, the aeration mode comprising directing an effective volume of gas to the plurality of tube elements for a third period of time sufficient to detach and suspend the particulate media from the plurality of tube elements. The method may comprise operating the system in a pre-filtration mode after the cleaning mode by reversing the flow of water through the regenerative media filter for a fourth period of time sufficient to coat the plurality of tube elements with the particulate media. The method may comprise operating the system in a drain mode, the drain mode comprising opening a drain valve. The method may comprise operating the system in the filtration mode following the drain mode.

In some embodiments, the method further comprises measuring the differential pressure across the regenerative media filter in the filtration mode or the cleaning mode.

In some embodiments, the cleaning mode comprises detaching and suspending of the particulate media by mechanical movement of the plurality of tube elements. The detaching and suspending of the particulate media by mechanical movement of the plurality of tube elements may occur prior to the aeration mode. In some embodiments, the cleaning mode comprises detaching and suspending of the particulate media by directing filtered water through the regenerative media filter in a second direction opposite the first direction. The detaching and suspending of the particulate media by directing filtered water through the regenerative media filter in a second direction opposite the first direction may occur prior to the aeration mode.

The method may comprise operating the system in the aeration mode responsive to the first period of time trending downward. In some embodiments, second period of time is less than about 15 minutes. In particular embodiments, the second period of time is less than about 5 minutes.

In some embodiments, the first predetermined differential pressure range is between about 10 psi and about 15 psi. In some embodiments, the second predetermined differential pressure range is between about 5 psi and about 10 psi.

In some embodiments, the method may further comprise operating the system in the drain mode responsive to the first period of time trending downward.

In some embodiments, the method may further comprise rinsing the regenerative media filter vessel after operating the system in the drain mode. In some embodiments, the method may further comprise replacing the particulate media after rinsing the regenerative media filter vessel.

In accordance with another aspect, there is provided a non-transitory computer-readable medium having computer-readable signals stored thereon that define instructions, that, as a result of being executed by a controller, instruct the controller to perform a method of operating a water filtration system comprising acts of receiving an input signal representative of at least one of a differential pressure value and a flow rate value across a regenerative media filter, and generating an output signal configured to actuate a plurality of valves responsive to the input signal. The output signal may be configured to operate the system in a filtration mode for a first period of time by directing water to be filtered through the regenerative media filter in a first direction to filter the water by contact with a particulate media attached to a plurality of tube elements for a first period of time to produce filtered water until a differential pressure across the regenerative media filter is within a first predetermined differential pressure range associated with deteriorated operation of the regenerative media filter. The non-transitory computer-readable medium may be configured to operate the system in a cleaning mode responsive to the differential pressure being within the first predetermined differential pressure range for a second period of time sufficient to decrease the differential pressure across the regenerative media filter to be within a second predetermined differential pressure range associated with restored operation of the regenerative media filter. The non-transitory computer-readable medium may be configured to operate the system in an aeration mode responsive to the differential pressure being within the second predetermined differential pressure range for a second period of time sufficient to detach and suspend the particulate media from the plurality of tube elements.

In some embodiments, the method of operating the water filtration system may further comprise acts of generating an output signal configured to alert a user or service provider of a status of the system, responsive to the first period of time trending downward.

In some embodiments, the cleaning mode comprises detaching the particulate media by mechanical movement of the plurality of tube elements. In some embodiments, the cleaning mode comprises suspending of the particulate media by directing water through the regenerative media filter in a second direction opposite the first direction.

In some embodiments, the output signal may further be configured to drain the regenerative media filter vessel responsive to the first period of time trending downward.

The output signal may further be configured to, after the second period of time, direct the filtered water through the regenerative media filter in the first direction for recirculation for a third period of time sufficient to coat the plurality of tube elements within the regenerative media filter with a particulate media. The output signal may further be configured to, after the third period of time, direct the water through the regenerative media filter in the first direction, for filtration for a fourth period of time until the differential pressure value is within the first predetermined differential pressure range.

In some embodiments, the method of operating the water filtration system may further comprise acts of generating an output signal configured to alert a user or service provider of a status of the system responsive to the fourth period of time being less than 25% of the first period of time.

In some embodiments, the method of operating the water filtration system may further comprise acts of generating an output signal configured to alert a user or service provider of a status of the system responsive to the fourth period of time being 50% less than the first period of time.

The output signal may further be configured to drain the regenerative media filter after the fourth period of time.

In accordance with another aspect, there is provided a controller for a water filtration system. The water filtration system may comprise a regenerative media filter vessel having an inlet fluidly connectable to a feed source and an outlet fluidly connectable to an end use, the regenerative media filter vessel housing a tube sheet comprising a plurality of tube elements and a particulate media. The controller may be operably connectable to an input sensor comprising at least one of a pressure sensor subsystem and a flow meter, the input sensor configured to generate an input set of values associated with at least one of a differential pressure and a flow rate across the regenerative media filter vessel. The controller may be operably connectable to an output device comprising a plurality of valves configured to be actuated responsive to an output set of set of values generated by the controller.

The controller may comprise a system processor coupled to a memory device storing data from the input set of values. The controller may be configured to execute a decoder function configured to program the system processor to receive the data from the input set of values and provide the input set of values to the decoder function, and perform at least one calculation on the input set of values using the decoder function to generate the output set of values.

The output set of values may be configured to actuate the plurality of valves in a filtration mode to direct water to be filtered through the regenerative media filter in a first direction to filter the water by contact with a particulate media attached to a plurality of tube elements for a first period of time to produce filtered water until a differential pressure across the regenerative media filter is within a first predetermined differential pressure range associated with deteriorated operation of the regenerative media filter vessel. The output set of values may be configured to actuate the plurality of valves in a cleaning mode responsive to the differential pressure value being in the first predetermined differential pressure range, for a second period of time sufficient to decrease the differential pressure to be within a second predetermined differential pressure range associated with restored operation of the regenerative media filter vessel. The output set of values may be configured to actuate the plurality of valves following the second period of time in an aeration mode responsive to the differential pressure being within the second predetermined differential pressure range for a second period of time sufficient to detach and suspend the particulate media from the plurality of tube elements.

In some embodiments, the cleaning mode comprises detaching and suspending of the particulate media by mechanical movement of the plurality of tube elements. In some embodiments, the cleaning mode comprises detaching and suspending of the particulate media by directing filtered water through the regenerative media filter in a second direction opposite the first direction.

In some embodiments, the cleaning mode comprises detaching and suspending of the particulate media by mechanical movement of the plurality of tube elements. In some embodiments, the cleaning mode comprises detaching and suspending of the particulate media by directing filtered water through the regenerative media filter in a second direction opposite the first direction.

In some embodiments, the controller may be operably connectable to a user interface configured to alert a user or service provider of a status of the system responsive to the first period of time trending downward. The user interface may be configured to generate a user-selected set of values associated with at least one of a threshold differential pressure, a threshold flow rate, a threshold first period of time, and a threshold second period of time. The memory device may store data from the user-selected set of values. The decoder function may further be configured to program the system processor to receive the data from the user-selected set of values and provide the user-selected set of values to the decoder function to train the decoder function.

The output set of values may further be configured to actuate the plurality of valves after the second period of time to direct the filtered water through the regenerative media filter in the first direction, for recirculation for a third period of time sufficient to coat the plurality of tube elements with the particulate media.

The output set of values may further be configured to actuate the plurality of valves after the third period of time to direct the water through the regenerative media filter in the first direction, for filtration for a fourth period of time until the differential pressure value is within the first predetermined differential pressure range.

In some embodiments, the output set of values may further be configured to actuate the plurality of valves to drain the regenerative media filter vessel responsive to the first period of time trending downward.

The controller may be operably connectable to a predictive signal processor configured to generate a predictive set of values associated with a predictive signal. The memory device may store data from the predictive set of values. The decoder function may further be configured to program the system processor to receive the data from the predictive signal processor and provide the predictive set of values to the decoder function to train the decoder function. The predictive set of values may be configured to predict at least one of the first period of time, the second period of time, the third period of time, and the fourth period of time.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is an exterior view. FIG. 3B is a vertical cross-section showing the placement of a gas distributor below a plurality of tube elements connected to a tube sheet.

DETAILED DESCRIPTION

Figure 1:
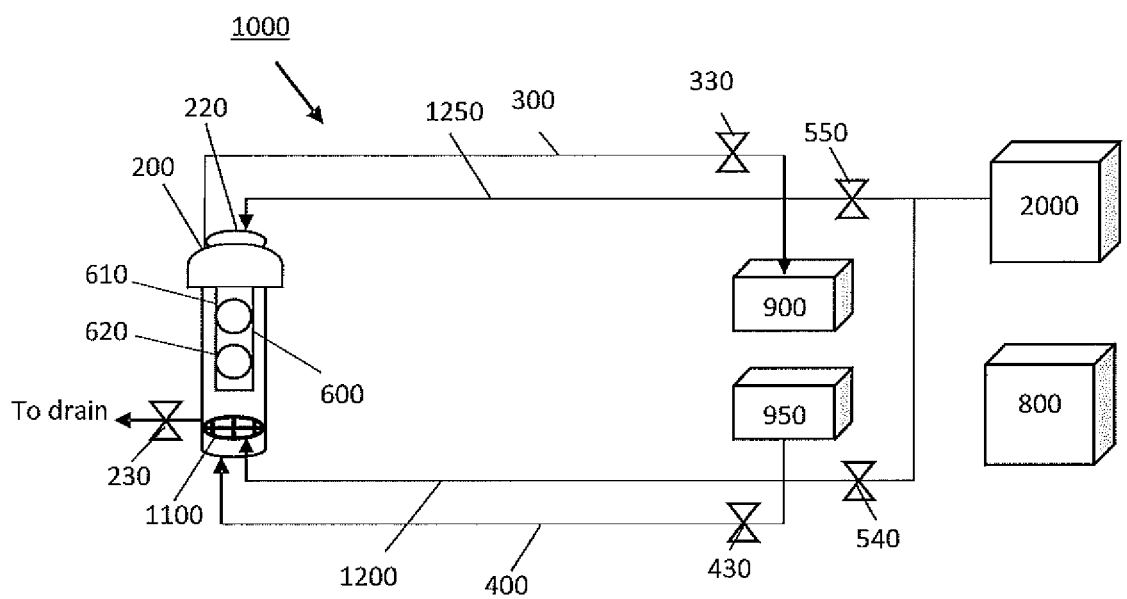
FIG. 1 is a schematic diagram of an exemplary water filtration system, according to one embodiment.

Systems and methods for treatment of water for use in aquatics and recreational facilities are disclosed herein. The systems and methods may provide filtration of the aquatic and/or recreational water by treatment with a media filter. Media filters typically function as particle removal filters by using a structure, for example, a porous structure, on which a medium may be coated. For example, a regenerative media filter may comprise a tube sheet containing a plurality of porous tube elements and a perlite or diatomaceous earth (DE) media.

Media filters generally employ a special grade medium to treat water. The special grade medium may be contained in a vessel or other container. The media filter may be a pressure-fed or high-rate media filter. During filtration, the water to be treated may be fed to the media filter vessel, for example, by one or more pumps. Inside the media filter vessel, the water may be distributed by a water distribution head before coming into contact with the special grade medium in the vessel. Generally, the special grade medium acts as a substrate and catches solid contaminants contained in the water. The filtered water is discarded from the vessel and may be returned to the source for further use in the aquatic or recreational facility. The vessel may include one or more vents that can be opened manually or automatically to regulate pressure within the vessel during one or more modes of operation.

In accordance with certain embodiments, the media filter may be a regenerative media filter, an activated carbon filter, or a walnut shell filter. The media filter may comprise any suitable particulate media for filtering aquatic and/or recreational water. The media filter may comprise perlite or DE media. In some embodiments, the media filter may be, for example, a DEFENDER® media filter (distributed by Evoqua Water Technologies LLC, Pittsburgh, PA).

The media filter may comprise a structure coated with the media. For example, the media filter may comprise plastic tubes, optionally porous plastic tubes. A plurality of plastic tubes may be arranged on a tube sheet, for example, concentrically. In some embodiments, the tubes may comprise a metal, such as stainless steel. Media filters of the coated structure type are described in PCT/US2019/056850 filed Oct. 18, 2019 titled "REGENERATIVE MEDIA FILTER AND RELATED METHODS" and WO 2019/055903 filed Sep. 17, 2018 titled "SAND FILTER LED STATUS LIGHT," the disclosure of which is herein incorporated by reference in its entirety for all purposes.

In use, the porous tubes may be coated with perlite or DE. In such an embodiment, the porous tubes may be used to prevent the substrate from passing into the filtrate of the media filter. Once coated, the water to be treated may pass through the coating and then through the structure. The coating layer may provide for very fine filtration media, such that the media filter may filter liquids to a small particle size. In some embodiments, the media filter may be configured to filter liquids to less than 10 µm. The media filter may be configured to filter liquids to less than about 10 µm, less than about 5 µm, less than about 3 µm, or less than about 1 µm.

The media filter vessel may generally be connectable, and in use fluidly connected, to a source of water. In accordance with one aspect, there is provided a water filtration system for treating water for use in aquatics or recreational facilities. The water filtration system may comprise a media filter vessel connectable to a source of water. The water filtration system may comprise one or more lines, pipes, valves, or pumps positioned to distribute the water within the system and optionally to return the treated water to the aquatic or recreational facility after treatment. In some embodiments, water filtration systems of the invention may include gas lines configured to distribute pressurized gases, such as compressed air, to one or more pneumatic components of the system.

In some embodiments, the water to be treated may include water for human or veterinary applications. For example, the water may be used for recreational purposes, such as swimming. The water may be associated with a pool, spa, hot tub, water park, water fountain, aquarium, zoo, animal reserve, and the like. Typically, the regenerative media filter vessel may be positioned in the vicinity of the source of the water. In some embodiments, the regenerative media filter vessel may be remote from the source of the aquatic and/or recreational water.

The water to be treated may have a concentration of organic contaminants. In some embodiments, the organic contaminants may include one or more of animal waste, food particles, and foreign matter such as mold, mildew, moss, and/or algae.

While embodiments described herein generally refer to aquatic and recreational facilities water, such an application is exemplary. It should be understood that the systems and methods disclosed may be employed for filtration of any fluid to be filtered with a particulate media filter. For instance, systems and methods disclosed herein may be employed for filtration of potable water, aquaculture, irrigation, stormwater management, water for use of oil and gas processing, and other applications.

The regenerative media filter vessel may be of a size suitable for processing between 70 and 2500 gallons per minute (GPM) of water. For example, the regenerative media filter vessel may be sized to process between about 70 GPM and about 100 GPM, between about 100 GPM and about 250 GPM, between about 250 GPM and about 500 GPM, between about 500 GPM and about 1000 GPM, between about 1000 GPM and about 2000 GPM, or between about 2000 GPM and about 2500 GPM. The regenerative media filter may comprise more than one vessel, arranged in series or in parallel. Generally, the size and arrangement of regenerative media filter vessels may vary with the size of aquatic or recreational structure to be filtered.

Figure 2:
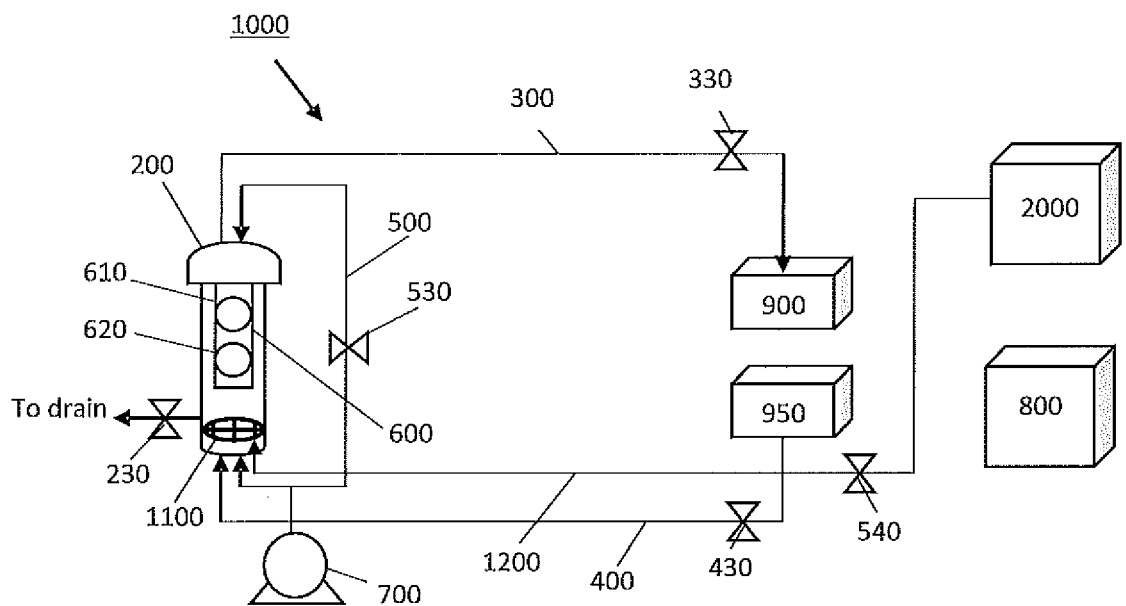
FIG. 2 is a schematic diagram of an exemplary water filtration system, according to another embodiment.

As shown in FIGS. 1 and 2, an exemplary water filtration system 1000 may comprise a regenerative media filter vessel 200. The filter vessel 200 may house a tube sheet comprising a plurality of tube elements, and particulate media, as previously described. The filter vessel 200 may be fluidly connectable to a feed source 950 comprising water to be filtered and fluidly connectable to an end use 900 configured to receive filtered water. In some embodiments, the feed source 950 and the end use 900 may be the same water. For instance, the feed source 950 and the end use 900 may be an aquatic or recreational water source, for example, a pool or an aquarium tank. The regenerative media filter vessel may additionally comprise a drain outlet. The filter vessel 200 may include a gas distributor 1100 fluidly connected to source of gas 2000 by gas line 1200. Volumes of gas may be delivered to the gas distributor 1100 by the actuation of first gas valve 540.

As shown in FIGS. 1 and 2, the water filtration system 1000 may comprise a series of water lines. The water filtration system 1000 may have a feed line 400 fluidly connected to an inlet of the filter vessel 200 and fluidly connectable to the feed source 950. The water filtration system 1000 may comprise a filtrate line 300 fluidly connected to an outlet of the filter vessel 200 and fluidly connectable to an end use 900. In some embodiments, such as shown in FIG. 2, the water filtration system 1000 may further comprise a recirculation line 500 extending between an outlet and an inlet of the filter vessel 200. The recirculation line 500 may be used for recirculation and reverse recirculation of the water and the filtered water through the filter vessel 200.

The water filtration system 1000 may comprise a series of valves positioned throughout the various water lines and configured to control directionality of water throughout the system 1000. The water filtration system 10000 may comprise feed valve 430 and end use valve 330 configured to allow passage of the water to the filter vessel 200 and allow passage of the filtered water to the end use 900, respectively, when opened. As shown in FIG. 1, the water filtration system 1000 may comprise a second gas valve 550 that permits gas from source of gas 2000 to enter and exit inflatable bladder 220 to allow for mechanical movement of the internal components of filter vessel 200, with the gas entering and exiting the inflatable bladder 220 via gas line 1250. In use, gas may be used to inflate and deflate the inflatable bladder 220, and the cycles of inflation and deflation mechanically agitate the internal components within the filter vessel 200 to dislodge contaminants and particulate media from the internal components. As shown in FIG. 2, the water filtration system 1000 may comprise at least one recirculation valve 530 positioned on the recirculation line 500 and configured to allow passage of the water or filtered water in recirculation or reverse recirculation through the filter vessel 200. The system 1000 may additionally comprise a drain valve 230 configured to drain the water, particulate media, and contaminants from the filter vessel 200 when open. The drained water, particulate media, and contaminants may be discarded. In some embodiments, the particulate media may be collected and regenerated for further use, for example, by a service provider. As shown in FIG. 2, the recirculation line 500 recirculates filtered water through the filter vessel 200 in a clockwise direction. Additionally, as shown in FIG. 2, the recirculation line 500 reverse recirculates filtered water through the filter vessel 200 in a counterclockwise direction.

As shown in FIG. 2, the system 1000 may comprise or be associated with at least one recirculation pump 700. The recirculation pump 700 may be positioned and configured to direct the water or filtered water through the system 1000. For instance, the recirculation pump 700 may be positioned and configured to direct water from an aquatic and/or recreational water source (feed source 950) to the filter vessel 200. The recirculation pump 700 may be positioned and configured to direct filtered water from the filter vessel 200 to the aquatic and/or recreational source (end use 900). The recirculation pump 700 may be positioned and configured to circulate water within the system 1000. More than one recirculation pump may be employed to effectively direct water and/or filtered water through the system 1000. The type, location, and function of the pump is non-limiting.

As shown in FIGS. 1 and 2, the system 1000 may comprise a pressure sensor subsystem 600 configured to measure the differential pressure of a liquid across the media filter vessel. The pressure sensor subsystem 600 may generally include an inlet pressure sensor 610 and an outlet pressure sensor 620. For example, the pressure sensor subsystem 600 may be configured to measure differential pressure between a liquid inlet and a liquid outlet of the media filter vessel. Accordingly, the pressure sensor subsystem 600 may be arranged as a differential pressure sensor subsystem. Any one or more of the pressure sensors may be electronic. The pressure sensors may be digital or analog. The system may comprise a flow meter positioned at an inlet or outlet of the regenerative media filter vessel 200, in addition to or in lieu of the pressure sensor subsystem 600. The flow meter may be configured to measure flow rate of the water or filtered water through the regenerative media filter vessel 200.

As shown in FIGS. 1 and 2, the system may comprise a controller 800. The controller may be operably connectable or, in use, operably connected, to at least one of the pressure sensor subsystem 600, and a valve (for example, 230, 330, 430, 530, 540, and 550) of the system 1000. In particular embodiments, the controller may be operatively connectable to a second gas valve 550 configured to inflate and deflate inflatable bladder 220 connected to the tube sheet. In other embodiments, the controller may be operatively connectable to a first gas valve 540 that controls to flow of gas into a gas distributor 1100 positioned below the plurality of tube elements. In certain embodiments, the controller 800 may be operably connectable or connected to a pump 700. The controller 800 may be operably connectable or, in use, operably connected, to a sensor configured to measure at least one parameter of the feed source 950.

In some cases, the regenerative media filter vessel of the system comprises a gas distributor positioned below the plurality of tube elements. The gas distributor, when connected to a source of gas, delivers an effective volume of gas to produce a plurality of bubbles that may contact the plurality of tube elements coated with particulate media. The generated bubbles aid with agitating the tube elements, thus assisting in detaching the particulate media and contaminants adsorbed on said tube elements during a maintenance process. The increased cleaning efficiency of the plurality of tube elements using bubbles generated from the gas distributor reduces the number of required system shutdowns to do a manual cleaning, such as with a pressure washer.

Figure 3A:
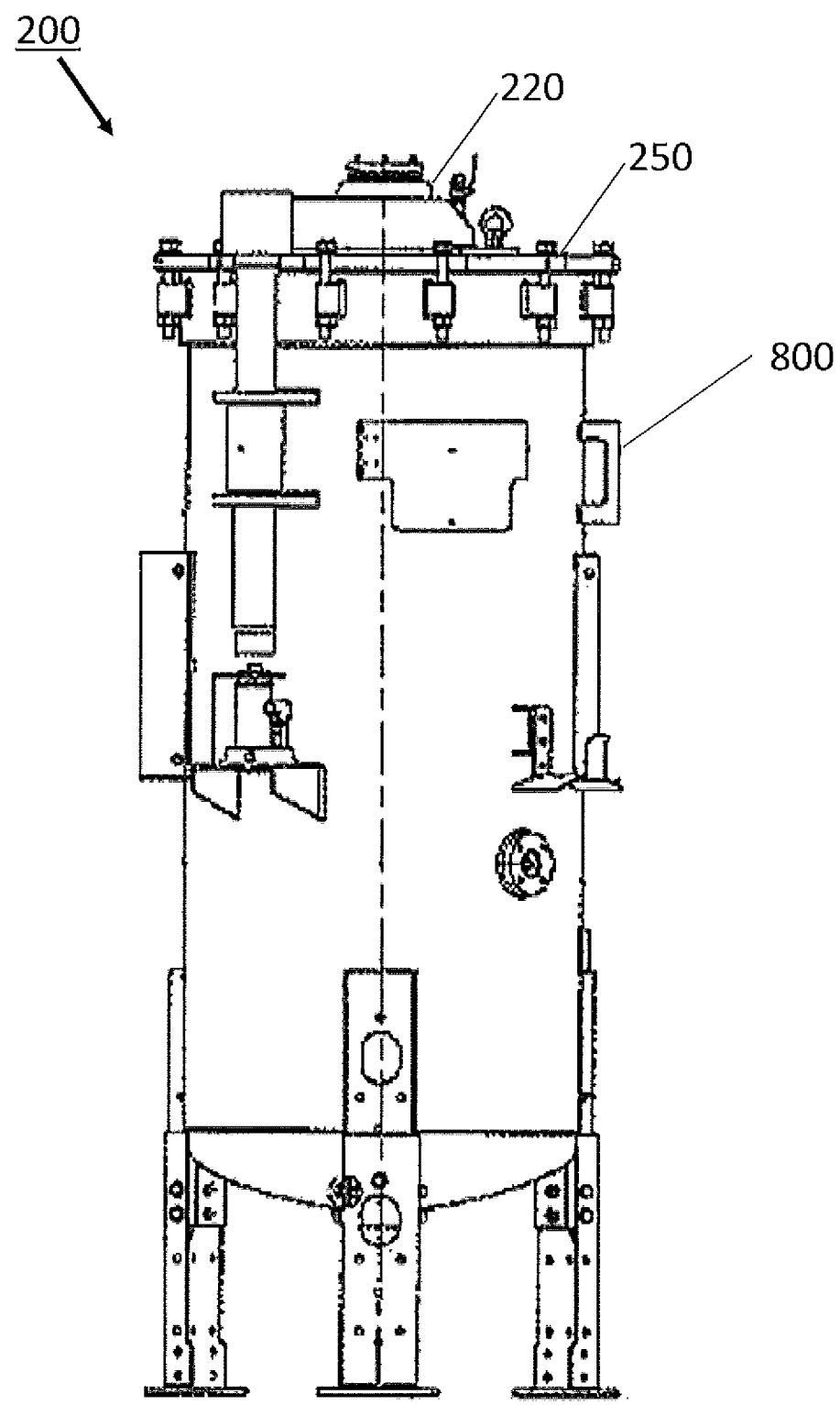
FIGS. 3A-3B are technical diagrams of a regenerative media filter vessel, according to one embodiment.
Figure 3B:
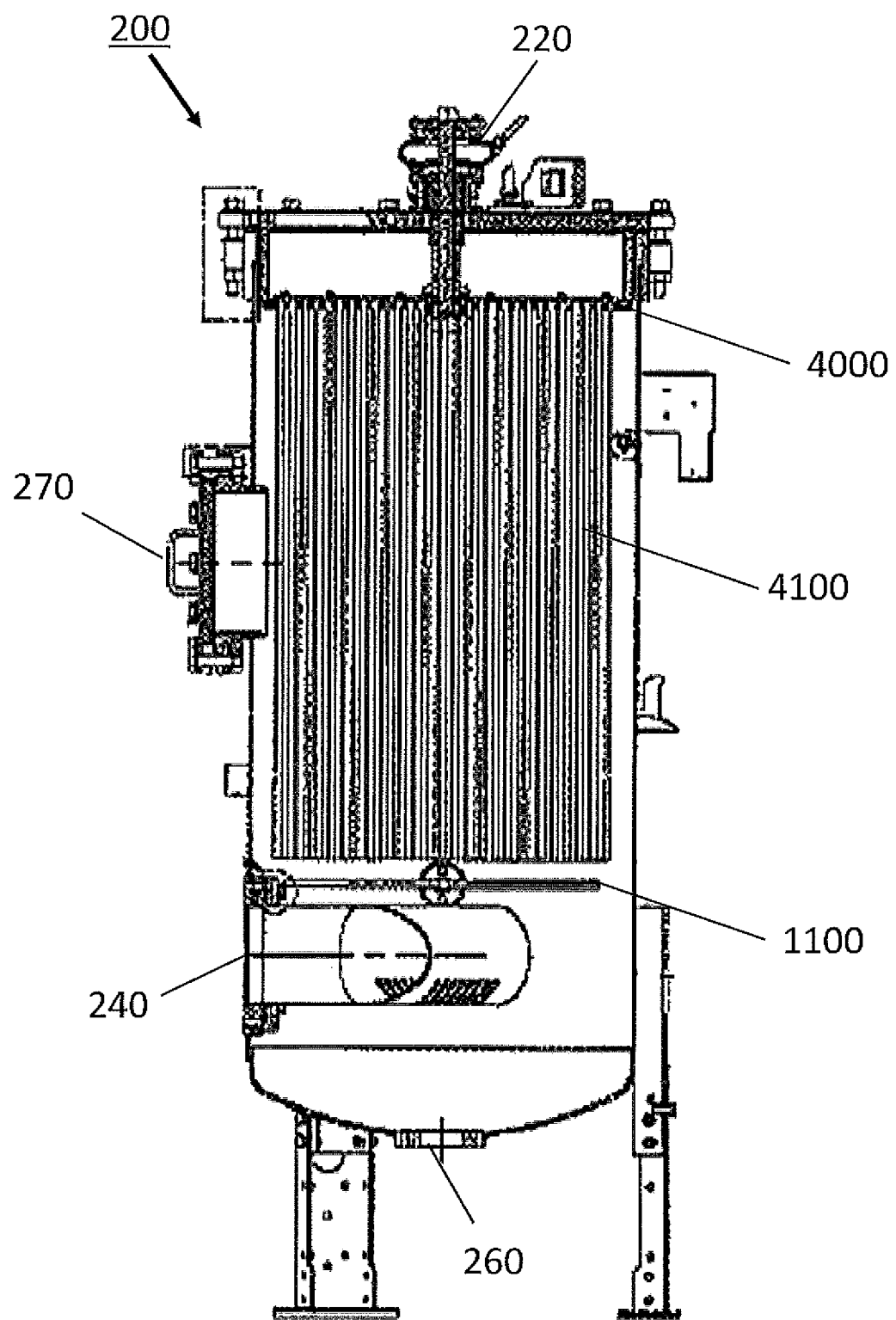

A regenerative media filter vessel including a gas distributor positioned below the plurality of tube elements is shown in FIGS. 3A-3B. FIG. 3A shows an exterior view of the filter vessel 200, with an inflatable bladder 220 disposed on the top of the filter vessel 200 to allow for mechanical movement of the internal components of filter vessel 200. The outlet 250 is disposed on the top of the filter vessel 200, with water to be filtered entering the filter vessel 200 from an inlet near the bottom of the filter vessel 200 (not shown). As shown in FIG. 3A, the filter vessel 200 may comprise a controller 800 that is connected to a wall of the filter vessel 200.

FIG. 3B shows a vertical cross-section of the filter vessel 200. The filter vessel 200 houses a tube sheet 4000 comprising a plurality of tube elements 4100; the tube sheet 4000 is connected to inflatable bladder 220 and the tube sheet 4000 and plurality of tube elements 4100 may be mechanically moved within filter vessel 200 upon inflation and deflation of the inflatable bladder 220. Positioned below the plurality of tube elements 4100 is a gas distributor 1100 that may be configured to deliver a plurality of bubbles into filter vessel 200 to aid in a maintenance process performed on the filter vessel 200. The filter vessel 200 may comprise an inlet 240 to allow water to be treated to enter the filter vessel. The filter vessel 200 may further comprise a drain 260 configured to drain the water, particulate media, and contaminants from the filter vessel 200 when open. The filter vessel 200 may additionally comprise a view port 270 permitting visual monitoring of the plurality of tube elements 4100 during operation and maintenance processes.

Figure 4:
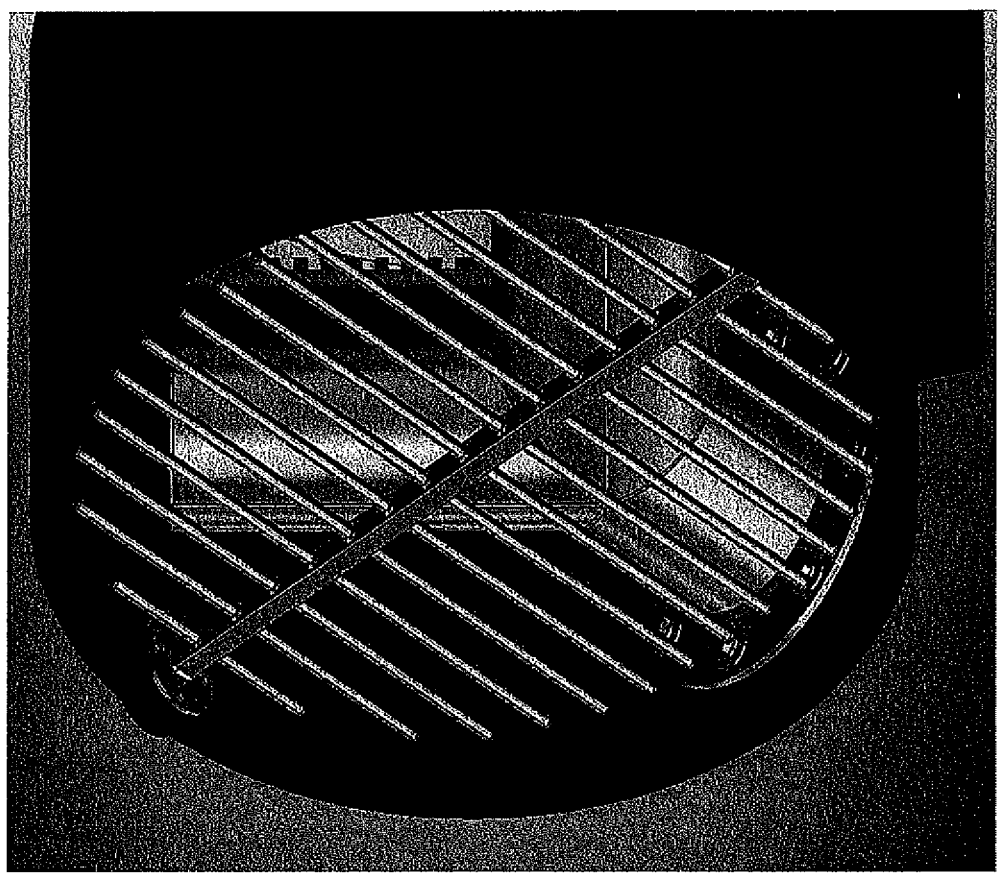
FIG. 4 is a rendering of a gas distributor positioned above the feed inlet of a regenerative media filter vessel.
Figure 5:
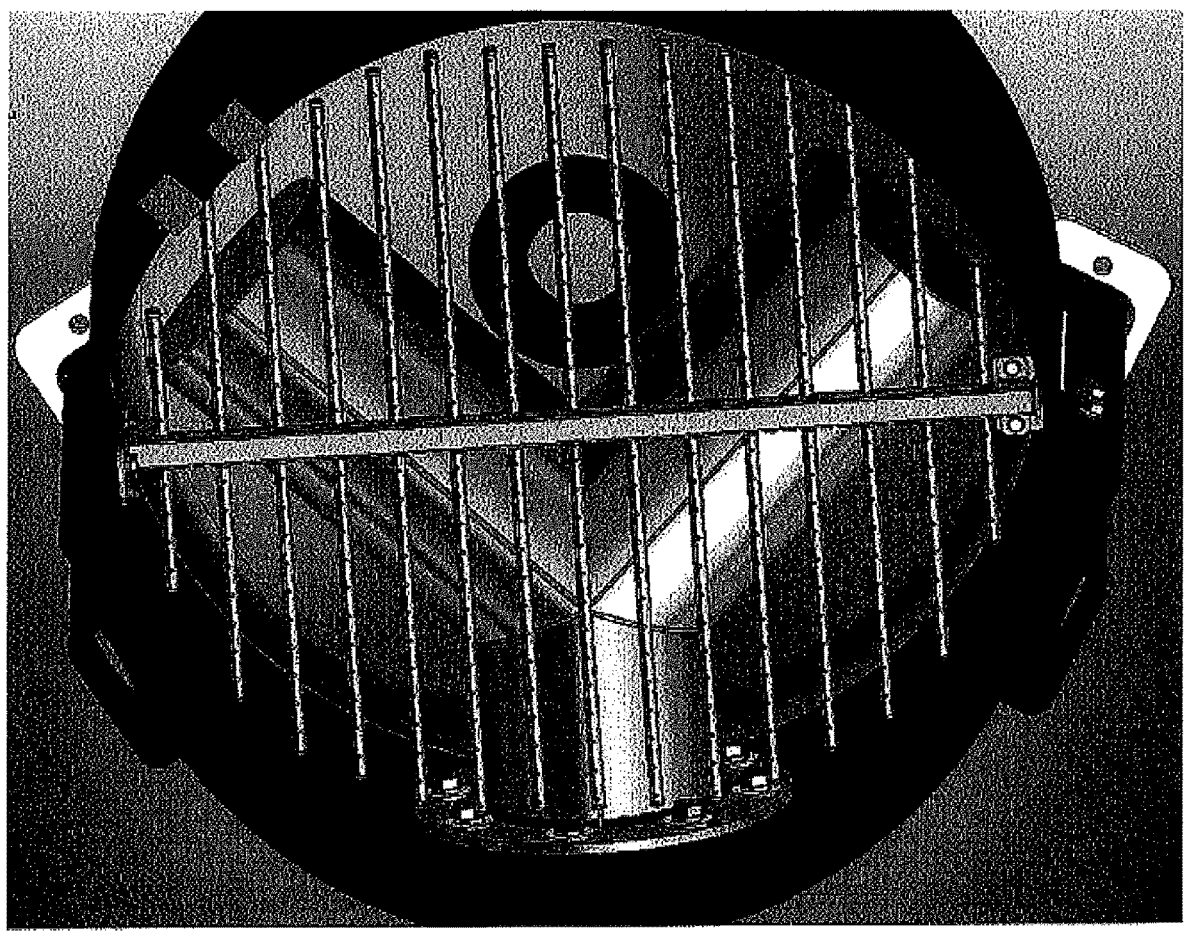
FIG. 5 is a rendering of a gas distributor positioned above the feed inlet of a regenerative media filter vessel.

FIGS. 4 and 5 are images of an embodiment of a gas distributor configured to span the dimensions of the regenerative media filter vessel. As shown in FIGS. 4 and 5, the gas distributor includes a central air channel and a plurality of smaller lateral gas channels fluidly connected and orthogonal to the central gas channel. The central gas channel may be connected to a second inlet formed in the regenerative media filter vessel that is configured to be connected to a source of gas via a gas line and gas valve. Each of the smaller lateral gas channels comprises a plurality of nozzles, such as holes, that can direct bubbles up and into the plurality of tube elements. The plurality of nozzles of each of the smaller lateral gas channels span the length of the smaller lateral gas channels on either side of the central air channel to ensure that bubbles are evenly distributed across the plurality of tube elements coated with particulate media. Gas distributors may be manufactured from any suitable material, such as a metal or a polymer, provided that the material is resistant to corrosion. In some embodiments, the material may be specially coated, for example, for waterproofing and/or resistance to organic material build-up. The material may be coated with, for example, a ceramic or epoxy coating.

It should be noted that while FIGS. 4 and 5 are images of one embodiment of a gas distributor, alternate embodiments are envisioned. For example, the gas distributor may have circular gas channels. The gas distributor may have concentric gas channels. The gas distributor may have a single channel with a plurality of openings. For example, the gas distributor may have a showerhead arrangement. Still other embodiments are within the scope of the disclosure.

The gas provided to the gas distributor to produce bubbles may be provided in a continuous flow or in a pulsed flow. The bubbles generated by pulsed flow may be random in size, duration and/or frequency. The bubbles may be introduced in a symmetrical or asymmetrical manner. As disclosed herein, bubbles introduced symmetrically refers to introducing bubbles evenly and uniformly throughout the regenerative media filter vessel from the gas distributor. Asymmetrically introduced bubbles refers to bubblers introduced substantially into a portion of the regenerative media filter vessel from the gas distributor.

The source of gas may be or include any suitable source of gas, such as compressed gas from a mechanical compressor or a compressed gas cylinder. Alternatively, or in addition, the source of gas may be a high-volume low-pressure gas source, such as a centrifugal air blower or similar. In typical operation, the gas from the source of gas is compressed air, mainly nitrogen. In some embodiments, the gas from the source of gas may include one or more additives, such as disinfecting agents, antimicrobial agents, or the like. Exemplary additives may include hydrogen peroxide vapor, ozone, ammonia gas, and chlorine gas. Other additives are within the scope of the disclosure.

The methods of filtering water in a system comprising the regenerative media filter disclosed herein may comprise operating the system in a filtration mode. In general, the filtration mode may include directing the water through the media filter in a first direction configured to contact the water with the particulate media and porous structure. Thus, the method may comprise opening a feed valve configured to allow passage of water to be filtered into the system and opening an end use valve configured to allow passage of the filtered water out of the system.

Periodically, the media filter may require cleaning. As contaminants such as dirt and debris build up on a surface of the porous structure, the pressure difference across the inlet and outlet of the media filter vessel typically increases. Thus, media filters are generally cleaned once the differential pressure reaches a predetermined threshold level. The methods may comprise operating the system in the filtration mode until the differential pressure across the regenerative media filter is within a first predetermined differential pressure range, associated with deteriorated operation of the regenerative media filter.

The predetermined differential pressure values may be associated with a debilitating layer cake built up on the porous structure. For instance, the predetermined threshold values may be associated with a layer cake of about ⅛ inches built up on the filter tubes. In certain embodiments, the predetermined threshold values may be associated with a layer cake, for example, a layer cake of organic contaminants, of about ¼ to ½ inches build up on the filter tubes. In some embodiments, the predetermined differential pressure value may be at least 5 psi, 7 psi, or 10 psi. For example, the first predetermined differential pressure range may be about 7 psi-10 psi, 10 psi-12 psi, 12 psi-15 psi, 10 psi-15 psi, or at least 15 psi.

Differential pressure may generally have an effect on flow rate. In some embodiments, the methods may comprise measuring flow rate. Flow rate may be measured in addition to measuring differential pressure or instead of measuring differential pressure. Changes in differential pressure may be determined by measured changes in flow rate. The method may comprise operating the system in the filtration mode until to a measured flow rate is within a predetermined threshold. Thus, in some embodiments, the methods may comprise measuring the flow rate of water through the regenerative media filter in the filtration mode. The flow rate may be measured and displayed or otherwise reported by a flow meter.

Health Departments typically regulate a turnover rate of water filtration in a swimming pool. For instance, Health Departments may instruct a maximum turnover rate. The methods disclosed herein may comprise operating the water filtration system to have an aquatic or recreational water turnover rate of at most 4 hours, 5 hours, 6 hours, 7 hours, or 8 hours. In some embodiments, the water to be treated is in an aquatic setting, such as an aquarium. For example, in aquatic uses, the animals present in the aquarium, such as mammals or fish species, produce large concentration of organic materials, such as food or waste products, that will need to be removed from the water. These contaminants are difficult to remove with conventional cleaning methods, and this results in more frequent tube element washing, such as by manually washing the plurality of tube elements with a pressure washer or other similarly effective cleaning apparatus. Manual cleaning requires additional labor and increases filter downtime.

The flow rate of water being filtered through the media filter may have an effect on turnover rate. In accordance with certain embodiments, the system may be operated at a flow rate of at least a threshold flow rate to provide the desired turnover rate. In such embodiments, the methods may comprise monitoring and/or controlling the flow rate. The methods may comprise operating the system in a cleaning or drain mode responsive to the flow rate being lower than a threshold flow rate.

The threshold flow rate may be calculated b the following equation:

$$F = \frac{V}{t}$$

Where:
F=threshold flow rate (gpm);
V=volume of water in source of water (g); and
t=maximum turnover time (min).

The method may comprise operating the system in a cleaning mode responsive to the differential pressure being within the first predetermined differential pressure range. The method may further comprise operating the system in an aeration mode by directing an effective volume of gas to the plurality of tube elements for a third period of time sufficient to detach the particulate media from the plurality of tube elements. The effective volume or rate of gas is typically sufficient to suspend the media in the water in the vessel. Thus, in some embodiments, the methods may comprise measuring the differential pressure across the regenerative media filter. The differential pressure may be measured and displayed or otherwise reported by the pressure sensor subsystem. Similarly, the methods may comprise operating the system in a cleaning mode and optionally an aeration mode responsive to a measured flow rate being within a predetermined threshold.

A media filter comprising structures, such as DEFENDER®, may be cleaned by expelling the media and contaminants from the structure and into suspension. The cleaning process generally allows the filter structure to receive a fresh coating layer once the coating particles reattach to the filter structure. In a regenerative media filter, the cleaning process may be performed once daily, twice daily, on alternating days, or as needed depending on the differential pressure measured across the media filter vessel. After cleaning, the structures may be recoated with media using a coating or pre-filtering process. The recoated media filter may be placed back into service.

Media and contaminants may be cleaned from the tube elements by a pneumatic bumping process. Pneumatic bumping generally involves using a source of gas, such as compressed air, and an inflatable bladder or tire. The bladder or tire may be inflated by actuation of a compressed air valve to mechanically raise and lower the filter structure coated with media and contaminants. Raising and lowering the structure forces water into the structure, detaching the media from the surface of the structure and sending it into suspension. The suspended media settles in the filtration vessel. After pneumatic bumping, the structures may be recoated with media and placed back into service.

The pneumatic bumping mechanism is typically driven by a plurality of system components, including the inflatable bladder or tire, an air compressor, an air filter, and a mechanism for removal of moisture from the pneumatic system. Additionally, pneumatic bumping may take between 5 and 15 minutes. Occasionally, the pneumatic bumping process may be performed for 15 to 20 minutes.

Systems and methods disclosed herein may employ a hydraulic cleaning process. The hydraulic cleaning process generally employs a recirculating pump and one or more valves to functionally achieve reverse recirculation of water through the structures. The one or more valves may be actuated to open or close in a predetermined sequence to perform the hydraulic cleaning process. The hydraulic effect from the actuation sequence may detach the media from the structure and send it into suspension, without employing significant mechanical stress. Specifically, the hydraulic process may effectively remove media and contaminants from the structure, while reducing the need to incorporate physical raising and lowering of the structure.

Thus, the methods disclosed herein may comprise operating the system in a cleaning mode. In some embodiments, the cleaning mode may include mechanical movement of the plurality of tube elements by the inflation and deflation of an inflatable bladder operatively connected to said plurality of tube elements. In other embodiments, the cleaning mode may include directing the water through the media filter in a second direction, opposite the first direction. The flow of water in the second direction may be configured to suspend the particulate media in the water, e.g., filtered water. The cleaning mode may generally comprise closing a feed valve to block passage of water into the system and closing an end use valve to block passage of the filtered water out of the system. One or more recirculation valves may be opened to allow passage of the filtered water through a recirculation line of the system. Independent of the mechanism of action of the cleaning mode, particulate media that is attached to the plurality of tube elements is detached from the tube elements and brought into suspension within the regenerative media filter vessel.

The methods disclosed herein may comprise operating the system in an aeration mode. The aeration mode may be used after the cleaning mode to ensure that any remaining particulate media is detached from the plurality of tube elements. In some embodiments, the aeration mode may include directing a volume of gas into a gas distributor positioned below the plurality of tube elements to generate bubbles configured to assist with detaching the particulate media from the plurality of tube elements and suspending the media in the water within the vessel while ensuring that the regenerative media filter vessel is vented during aeration to maintain low pressure inside the vessel. The gas valve of the system may be actuated to open or close in a predetermined sequence to perform the aeration mode. In some embodiments, one or more vents on the filter vessel may be opened to regulate the pressure inside the filter vessel during the aeration mode.

The aeration mode typically occurs after one or more cycles of the cleaning mode as described herein. As a non-limiting example, a cleaning mode may be performed one or more times, the system being returned to filtration mode after each cleaning mode. As the cleaning mode is engaged when the differential pressure across the regenerative media filter is within a first predetermined differential pressure range associated with deteriorated operation of the regenerative media filter, the time difference between differential pressure readings is indicative of the effectiveness of the cleaning mode. If the time between differential pressure readings of successive cleaning modes is within a short time period, this may indicate that the cleaning mode (s) were ineffective and thus the particulate media must be replaced. The aeration mode may be used after a cleaning mode to ensure that all of the particulate media is detached from the plurality of tube elements prior to the replacement of the particulate media. Alternatively, in some cases, the aeration mode may occur concurrently with cleaning mode. As another non-limiting example, the aeration mode may occur during the inflation and deflation cycles used for pneumatic bumping, such as after each individual inflate-deflate cycle, or "bump." As another non-limiting example, the aeration mode may occur during the reverse recirculation within the regenerative media filter vessel.

The system may be operated in the cleaning mode for a period of time sufficient to decrease the differential pressure across the regenerative media filter to be within a second predetermined differential pressure range associated with restored operation of the regenerative media filter. The second predetermined differential pressure values may be associated with a reduction or release of the layer cake which had built up on the porous structure. For instance, the second predetermined threshold values may be associated with a reduction of the layer cake to less than about $\frac{1}{16}$ inches of built up on the filter tubes. The second predetermined differential pressure values may be associated with substantially no layer cake on the filter tubes. In some embodiments, the second predetermined differential pressure value may be at least 12 psi, 10 psi, 7 psi, 5 psi, 3 psi, 2 psi, or 1 psi. For example, the second predetermined differential pressure range may be about 1 psi-3 psi, 1 psi-5 psi, 5 psi-7 psi, less than 7 psi, 5 psi-10 psi, 7 psi-10 psi, less than 10 psi, 10 psi-12 psi, 12 psi-15 psi, or less than 15 psi. In certain embodiments, the second differential pressure may be at least 5 psi or at least 3 psi less than the first differential pressure. In some cases, the second predetermined differential pressure values may be associated with incomplete removal of the layer cake on the filter tubes. In this instance, a further cleaning of the tube elements may be achieved by aeration using the gas distributor positioned below the tube elements. In some embodiments, the third predetermined differential pressure value may be at least 12 psi, 10 psi, 7 psi, 5 psi, 3 psi, 2 psi, or 1 psi. For example, the third predetermined differential pressure range may be about 1 psi-3 psi, 1 psi-5 psi, 5 psi-7 psi, less than 7 psi, 5 psi-10 psi, 7 psi-10 psi, less than 10 psi, 10 psi-12 psi, 12 psi-15 psi, or less than 15 psi. In certain embodiments, the third differential pressure may be at least 5 psi or at least 3 psi less than the second differential pressure.

The method may comprise operating the system in a pre-filtration mode responsive to the differential pressure being within the second or third predetermined differential pressure range. Thus, in some embodiments, the methods may comprise measuring the differential pressure across the regenerative media filter in the cleaning mode. The differential pressure may be measured and displayed or otherwise reported by the pressure sensor subsystem.

Differential pressure may generally have an effect on flow rate. In some embodiments, the methods may comprise measuring flow rate. The method may comprise operating the system in a pre-filtration mode responsive to a measured flow rate being within a predetermined threshold. Thus, in some embodiments, the methods may comprise measuring the flow rate of water through the regenerative media filter in the cleaning mode. The flow rate may be measured and displayed or otherwise reported by a flow meter.

In other embodiments, the methods may comprise operating the system in the pre-filtration mode after the period of time sufficient to decrease the differential pressure has elapsed. The period of time may be associated with historic values of the differential pressure. The period of time may be preselected. For example, the method may comprise preselecting the period of time of operation in the cleaning mode and programming or setting the system to operate in accordance with the preselected period of time. In some embodiments, the period of time may be less than about 5 minutes. For instance, the period of time may be less than about 2 minutes, less than about 1.5 minutes, less than about 1 minute. The period of time may be between about 0.5-2 minutes, the period of time may be between about 40 seconds and 1.5 minutes.

The methods disclosed herein may comprise operating the system in a pre-filtration mode. The pre-filtration mode may comprise directing the water through the media filter in the first direction. The pre-filtration mode may be configured to coat the porous structure with the particulate media in preparation for the filtration mode. The pre-filtration mode may generally comprise operating the system with the same valve configuration as the cleaning mode but reversing directionality of the water through the recirculation line. Thus, during the pre-filtration mode, the feed valve may be closed to block passage of water into the system and the end use valve may be closed to block passage of the filtered water out of the system. One or more recirculation valves may be opened to allow passage of the filtered water through the recirculation line of the system.

The system may be operated in the pre-filtration mode for a period of time sufficient to coat the plurality of tube elements with the particulate media. The period of time may be between about 8-15 minutes. The period of time may be between about 8-10 minutes, 10-12 minutes, or 12-15 minutes. After coating the structure in the pre-filtration mode, the method may comprise resuming operation in the filtration mode.

In certain embodiments, the methods may comprise operating the system in the pre-filtration mode upon start-up. In such embodiments, the system may be loaded with water or feed water prior to operation in the pre-filtration mode. After the period of time sufficient to coat the structure, the method may comprise operating the system in the filtration mode, as previously described.

Periodically, the system may require draining of the regenerative media filter vessel. During cycled use, as previously described, contaminants may build up within the regenerative media filter vessel. The contaminants may be removed from the porous structure by operating in the cleaning mode and/or the aeration mode. However, the contaminants are generally retained within the regenerative media filter vessel during and after the cleaning mode, until the regenerative media filter vessel is drained.

Thus, the methods disclosed herein may comprise operating the system in a drain mode. The drain mode may include opening a drain valve on the regenerative media filter vessel and draining the vessel of water, particulate media, and contaminants. The drain mode may additionally comprise opening a feed valve to rinse or flush the regenerative media filter vessel. In some cases, the methods disclosed herein may include rinsing the regenerative media filter vessel after operating the system in the drain mode. After draining, the methods may comprise replacing the particulate media.

The methods may comprise operating the system in the cleaning mode, aeration mode, and/or drain mode responsive to the period of time of operation in the filtration mode (i.e., the period of time of operation in the filtration mode until the differential pressure across the regenerative media filter is within the first predetermined differential pressure range, associated with deteriorated operation of the regenerative media filter) trending downward. As disclosed herein, trending downward may generally refer to a period of time which is approaching a threshold value. The period of time may be estimated or expected to reach the threshold value within a predetermined period of time. In some embodiments, trending downward may refer to trending to zero or approaching zero. For instance, the period of time may be estimated or expected to reach substantially zero within a predetermined period of time.

In some embodiments, the methods may comprise operating the system in the cleaning mode, aeration mode, and/or drain mode responsive to the period of time of operation in the filtration mode being less than about 4 hours, less than about 3 hours, less than about 2 hours, less than about 1 hour, or less than about 0.5 hours from a predetermined threshold value. The methods may comprise operating the system in the drain mode responsive to the period of time of operation in the filtration mode being less than about 10 minutes, less than about 5 minutes, less than about 2 minutes, less than about 1 minute, less than about 30 seconds, less than about 10 seconds, or less than about 1 second from a predetermined threshold value. The predetermined threshold value may be the threshold value which triggers operation in the drain mode.

The methods may comprise operating the system in the cleaning mode, aeration mode, and/or drain mode responsive to the period of time of operation in the filtration mode (i.e. the period of time of operation in the filtration mode until the differential pressure across the regenerative media filter is within the first predetermined differential pressure range, associated with deteriorated operation of the regenerative media filter) being less than 50%, less than 35%, or less than 25% of the period of time of operation in a previous filtration mode. In some embodiments, operation in the previous filtration mode may refer to operation in the filtration mode immediately prior the current filtration mode. In other embodiments, operation in the previous filtration mode may refer to operation in a first filtration mode upon start-up or following a drain mode.

As previously described, the period of time of operation in the filtration mode may be determined by measuring differential pressure across the regenerative media filter vessel and/or flow rate of water or filtered water through the regenerative media filter. Thus, in accordance with some embodiments, the methods may comprise operating the system in the cleaning mode, aeration mode, and/or drain mode responsive to the differential pressure and/or flow rate exceeding a threshold value. Similarly, the methods may comprise replacing the particulate media responsive to the differential pressure and/or flow rate exceeding a threshold value.

The methods disclosed herein may comprise monitoring a status of the system. For instance, the methods may comprise monitoring a status of the water, the particulate media, and the contaminants within the regenerative media filter vessel, including, for example concentration of contaminants within the regenerative media filter vessel. The status may be monitored by storing and/or processing historic values of differential pressure across the regenerative media filter vessel. The status may be monitored by storing and/or processing historic values of the period of time of operation in the filtration mode, cleaning mode, aeration mode, and/or drain mode. The status may be monitored by storing and/or processing historic values of frequency of operating the filtration mode, cleaning mode, aeration mode, and/or drain mode. The status may be monitored by storing and/or processing historic values of any period of time of operation of the system (for example, operation in any of the various modes described herein). The status may be monitored by storing and/or processing historic values of flow rate of water and/or filtered water through the regenerative media filter vessel.

As the period of time of operation in the filtration mode trends to zero, operation of the filtration mode, cleaning mode, aeration mode, and/or drain mode approaches. Together with the draining mode, the method may comprise replacing the particulate media. The particulate media may be replaced by a user or by a service provider. Thus, as the period of time of operation in the filtration mode trends to zero, a user or service provider may be informed of the status of the system.

In certain embodiments, the method may comprise alerting a user or service provider of the need to replace the particulate media as a threshold period of time of operation in the filtration mode is reached. For instance, the method may comprise alerting a user or service provider as the period of time of operation in the filtration mode becomes less than about 30 minutes, less than about 15 minutes, less than about 10 minutes, or less than about 5 minutes.

The methods may comprise processing and storing data relating to historic values of frequency of operating in the draining mode and predicting a schedule of replacement of the particulate media. In some embodiments, the methods may comprise alerting a user or service provider of the need to replace the particulate media in about one week, about 72 hours, about 48 hours, or about 24 hours.

The methods of operating a water filtration system disclosed herein may be described with reference to input signals and output signals. The methods may comprise obtaining a first input signal from an input sensor. The first input signal may comprise at least one of a differential pressure value and a flow rate value. The methods may comprise acquiring a first input set of values from the first input signal.

The methods may comprise performing at least one calculation on the first input set of values using a decoder function to produce an output set of values. The output set of values may dictate operation of the water filtration system, as previously described. For instance, the output set of values may be configured to actuate the plurality of valves to direct water through the regenerative media filter vessel, as described herein.

Any one or more of the methods disclosed herein may be implemented by a controller. Briefly, the controller may be operably connected to the pressure sensor subsystem, the end use valve, the feed valve, the first gas valve, the second gas valve, and the at least one recirculation valve. The controller may be configured to direct the water through the regenerative media filter vessel in a first direction for operation in a filtration mode for a first period of time until the pressure sensor subsystem measures the differential pressure in a first predetermined differential pressure range associated with deteriorated operation of the regenerative media filter vessel.

Figure 6:
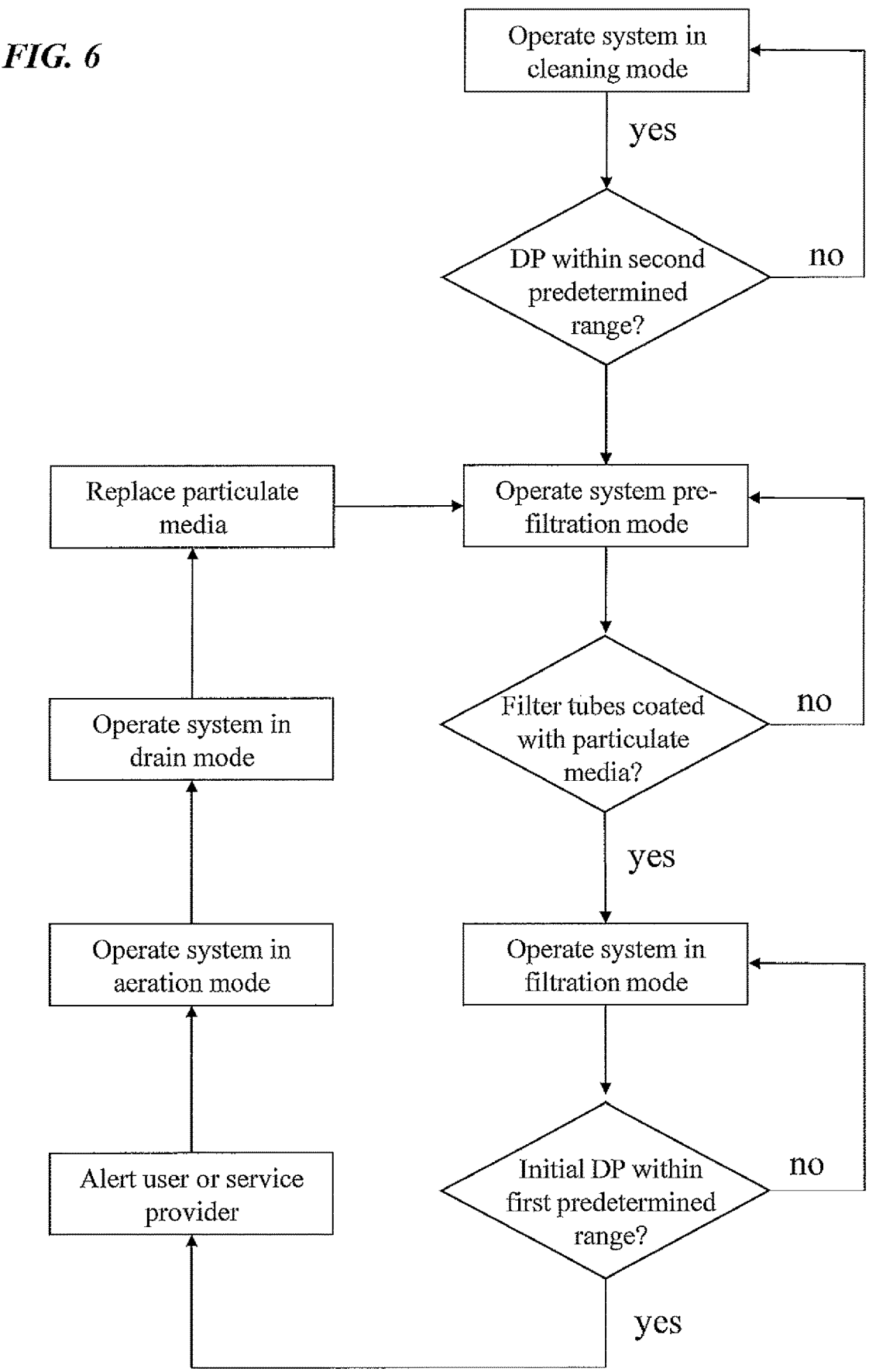
FIG. 6 is a flow diagram of an exemplary method for operating a water filtration system, according to one embodiment.

As example of the controller logic used to operate a water filtration system of the invention that is displaying degraded filtration performance is shown in FIG. 6. The controller or user interface may be configured to alert or inform the user or service provider of the status of the water filtration system, such as when a differential pressure reading is within the first predetermined pressure range after successive iterations of a cleaning mode. The controller or user interface may be configured to generate an alert that notifies the user or service provider that the period of time of operation in the filtration mode is trending to zero. In certain embodiments, the alert may be triggered by real-time measurements. In other embodiments, the alert may be triggered by predictive performance of the system. A service provider may be called to the location to replace the particulate media responsive to the alert, which may include operating the system in the aeration mode as described herein to detach, and suspend, the particulate media from the plurality of tube elements and operating the system in the drain mode to remove the at least partially suspended particulate media from the filter vessel. Thus, the methods disclosed herein may provide an automated subscription method for maintenance and replacement of the particulate media.

In some embodiments, the controller may be configured to inflate and deflate the inflatable bladder to force water into the regenerative media filter vessel in a cleaning mode responsive to the pressure sensor measuring the differential pressure in the first predetermined differential pressure range for a predetermined number of inflation-deflation cycles sufficient to decrease the differential pressure to be within a second predetermined differential pressure range associated with restored operation of the regenerative media filter vessel. In some cases, the predetermined number of inflation-deflation cycles is less than 10, such as 9, 8, 7, 6, 5, 4, 3, 2, or 1. In particular embodiments, the number of inflation-deflation cycles is 6.

In some embodiments, the controller may be configured to direct the filtered water through the regenerative media filter vessel in a second direction, opposite the first direction, for reverse recirculation in a cleaning mode responsive to the pressure sensor measuring the differential pressure in the first predetermined differential pressure range for a second period of time sufficient to decrease the differential pressure to be within a second predetermined differential pressure range associated with restored operation of the regenerative media filter vessel.

In some embodiments, the controller may be configured to direct an effective volume of gas from the source of gas through the gas distributor to produce a plurality of bubbles directed into the plurality of tube elements in an aeration mode. The effective volume of gas may be from about 1 cubic foot per minute of gas per cubic foot of water (cfm/ft$^3$) to 5 cfm/ft$^3$, such as 1 cfm/ft$^3$, 1.5 cfm/ft$^3$, 2 cfm/ft$^3$, 2.5 cfm/ft$^3$, 3 cfm/ft$^3$, 3.5 cfm/ft$^3$, 4 cfm/f, 4.5 cfm/ft$^3$, or 5 cfm/ft$^3$. For example, a regenerative media filter vessel having an overall volume of 110 ft$^3$ may require an effective volume of at least 110 cfm of gas flow through the gas distributor to produce bubbles. In some cases, the gas for the gas distributor may be produced using a high-volume low-pressure source, such as a blower, and in volumes of at least 300 cfm, at least 400 cfm, at least 500 cfm, or greater. The controller may be configured to begin the aeration mode by opening the first gas valve to allow an effective volume of gas to enter the gas distributor connected to the second inlet of the regenerative media filter vessel. Operation of the aeration mode may occur after the cleaning mode or during the cleaning mode. In some embodiments, the controller may be configured to open one or more vents of the filter vessel during the aeration mode to regulate pressure within the filter vessel.

In use, the controller may be operably connected to the pressure sensor subsystem. The controller may be a computer or mobile device. The controller may comprise a touch pad or other operating interface. For example, the controller may be operated through a keyboard, touch screen, track pad, and/or mouse. The controller may be configured to run software on an operating system known to one of ordinary skill in the art. The controller may be electrically connected to a power source. The controller may be digitally connected to the pressure sensor subsystem. The controller may be connected to the pressure sensor subsystem through a wireless connection. For example, the controller may be connected to the pressure sensor subsystem through wireless local area networking (WLAN) or short-wavelength ultra-high frequency (UHF) radio waves. The controller may further be operably connected to any pump or valve within the system, for example, to enable the controller to initiate or terminate the cleaning process as needed.

The controller may be programmed to direct the water or filtered water through the regenerative media filter vessel responsive to a measurement obtained from the pressure sensor, the flow meter, or an elapsed period of time. The controller may further be programmed to direct the water or filtered water through the regenerative media filter vessel responsive to predictive pressure differentials. The predictive pressure differentials may be generated from historic performance data.

The controller may be configured to initiate a cleaning mode of the regenerative media filter vessel responsive to the differential pressure measured by the pressure sensor. In some embodiments, the controller may be configured to initiate the cleaning process at a threshold differential pressure. The threshold differential pressure may be associated with deteriorated operation of the media filter vessel. For example, the threshold differential pressure may be 5 psi, 7 psi, 10 psi, 12 psi, or 15 psi.

The controller may further be configured to initiate restored operation of the media filter vessel upon completion of the cleaning process. The controller may be configured to reinitiate filtration at a second threshold differential pressure. The second threshold differential pressure may be associated with restored operation of the media filter vessel. For example, the second threshold differential pressure may be 12 psi, 10 psi, 7 psi, 5 psi, 3 psi, 1 psi, or less than 1 psi. In general, the second threshold differential pressure is lower than the first threshold differential pressure. The second threshold differential pressure may be 1 psi, 3 psi, 5 psi, or 10 psi lower than the first threshold differential pressure.

The controller may be configured to initiate an aeration mode of the regenerative media filter vessel responsive to the differential pressure measured by the pressure sensor. The aeration mode may occur after a cleaning mode or concurrently with a cleaning mode. In some embodiments, the controller may be configured to initiate the aeration mode at a threshold differential pressure. The threshold differential pressure may be associated with deteriorated operation of the media filter vessel. For example, the threshold differential pressure may be 5 psi, 7 psi, 10 psi, 12 psi, or 15 psi.

To direct the water and filtered water through the system, and initiate the one or more modes of operation, the controller may perform at least one calculation based on input values to generate output values that instruct performance. For instance, the controller may be operably connectable to an input sensor configured to generate an input set of values and transmit the input set of values to the controller. The input sensor may include, for example, the differential pressure sensor and/or the flow meter. Additionally, the controller may be operably connectable to an output device comprising the plurality of valves. The controller may transmit an output signal to the plurality of valves to be actuated responsive to the output set of set of values generated by the controller.

To generate the output signal, the controller may comprise a system processor coupled to a memory device storing data from the input set of values. The memory device may be an internal memory device, an external memory device, or a cloud-based memory device, as previously described. The controller may be configured to execute a decoder function configured to program the system processor to receive the data from the input set of values and provide the input set of values to the decoder function, and perform at least one calculation on the input set of values using the decoder function to generate the output set of values.

The output set of values may then be configured to actuate the plurality of valves to direct the water or filtered water through the regenerative media filter, vessel in accordance with the methods described herein.

The methods may further comprise obtaining a second input signal from a user interface, the second input signal comprising a user-selected parameter. Thus, the second input signal may comprise at least one of a selected threshold differential pressure, a selected threshold flow rate, a selected threshold first period of time, and a selected threshold second period of time. The methods may further comprise acquiring a second input set of values from the second input signal. The methods may further comprise performing at least one calculation on the second input set of values using the decoder function to produce the output set of values.

In certain embodiments, the controller may be operably connectable to a user interface. The user interface may be able to accept input signals from a user. Additionally, the user interface may be able to transmit output signals to a user. The user interface may be configured to alert a user or service provider of a status of the system responsive to the first period of time trending to zero. Thus, in some embodiments, the output set of values may be further configured to alert a user or service provider of a status of the system responsive to the first period of time trending to zero.

The user interface may be configured to generate a user-selected set of values from the input signals supplied by the user. The user-selected set of values may be associated with at least one of a threshold differential pressure, a threshold flow rate, a threshold first period of time, and a threshold second period of time. The memory device may store data from the user-selected set of values. The decoder function may further be configured to program the system processor to receive the data from the user-selected set of values and provide the user-selected set of values to the decoder function to train the decoder function. Thus, the controller may be configured to operate the system in accordance with the threshold values set by the user.

In certain embodiments, the methods may comprise obtaining a predictive signal. The predictive signal may comprise a period of time predictive signal, for instance, a predictive signal associated with a period of time of operation in at least one mode of operation. The method may comprise acquiring a predictive set of values from the predictive signal and training the decoder function with data from the predictive signal.

In accordance with certain embodiments, the controller may be operably connectable to a predictive signal processor configured to generate a predictive set of values associated with a predictive signal. The predictive set of values may be configured to predict at least one period of time of operation. The memory device may store data from the predictive set of values. The decoder function may further be configured to program the system processor to receive the data from the predictive signal processor and provide the predictive set of values to the decoder function to train the decoder function.

Thus, over time the controller may recognize and/or learn trends of the method of operating a water filtration system. The controller may then instruct the system to operate in accordance with the trends of operation. The controller may additionally inform a user or service provider of the trends of operation.

In accordance with another aspect, there is provided a non-transitory computer-readable medium. The non-transitory computer-readable medium may generally have computer-readable signals stored thereon that define instruction, that, as a result of being executed by the controller, instruct the controller to perform the methods of operating a water filtration system disclosed herein.

Thus, the non-transitory computer-readable medium may instruct the controller to perform methods comprising acts of receiving an input signal associated with a status of the system (for example, differential pressure or flow rate) and generating an output signal configured to operate the system (for example, actuate the plurality of system valves), as previously described.

In some embodiments, non-transitory computer-readable medium may instruct the controller to perform methods comprising acts of generating an output signal configured to alert a user or service provider of a status of the system, responsive to the first period of time trending to zero, as previously described. In certain embodiments, the output signal may further be configured to drain the regenerative media filter responsive to the first period of time trending to zero. The output signal may be configured to alert the user or service provider and/or drain the media filter responsive to predictive operation of the system, as previously described.

EXAMPLES

Prophetic Example—Cleaning and Aeration Modes

An operating sequence for cleaning a water filtration system comprising particulate media adsorbed onto a plurality of tube elements exhibiting reduced filtration performance may include operating the water filtration system in a cleaning mode and/or aeration mode. The cleaning mode may be initiated when the differential pressure between the pressure sensors at the inlet and the outlet of the filter vessel of the water filtration system is within the first predetermined differential pressure range having thresholds of between 10 psi to 15 psi. The cleaning mode may be performed for a period of time sufficient to detach and suspend the particulate media from the plurality of tube elements, such as less than 15 minutes. After cleaning, a pre-filtration mode may be initiated by reversing the flow of water through the regenerative media filter for a period of time sufficient to coat the plurality of tube elements with the particulate media, such as less than 15 minutes. The water treatment system may be returned to the filtration mode after the plurality of tube elements are coated with particulate media.

While in the filtration mode following the pre-filtration mode, if the differential pressure at the inlet and the outlet of the filter vessel reaches the 10 psi to 15 psi threshold range in shorter period of time, such as less than 1 day, the water filtration system may send an alert to a user or service provider informing them that the differential pressure has exceed the operating thresholds after a cleaning mode. The user or service provider may initialize an aeration mode to restore the vessel to acceptable filtration performance. The aeration mode may include the delivery of gas to a gas distributor at an effective volume of 1 cubic foot of gas per cubic foot of water ($cfm/ft^3$) in the filter vessel to produce bubbles that aid in agitating the plurality of tube elements and detaching the particulate media from the plurality of tube elements. The detached particulate media may be drained from the filter vessel and replaced. The water filtration system may then be operated in the pre-filtration mode for a period of time sufficient to coat the plurality of tube elements with the new particulate media, such as less than 15 minutes. The water treatment system may be returned to the filtration mode after the plurality of tube elements are coated with particulate media.

FIG. 6 depicts controller logic used to operate a water filtration system of the invention that is displaying degraded filtration performance as described in prophetic example 1.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A water filtration system, comprising:
    a regenerative media filter vessel comprising:
        a first inlet, a first outlet, and a second outlet;
        a tube sheet comprising a plurality of tube elements;
        a gas distributor fluidly connected to a first source of gas, the gas distributor positioned below the plurality of tube elements;
        an inflatable bladder fluidly connected to a second source of gas, the inflatable bladder configured to mechanically agitate the tube sheet upon inflation and deflation;
        and particulate media;
    a filtrate line fluidly connectable to the first outlet and an end use configured to receive filtered water;
    a feed line fluidly connectable to the first inlet and a feed source comprising water to be filtered media filter vessel;
    a gas line fluidly connected to the first source of gas and the gas distributor; and
    at least one pump configured to direct the water through the water filtration system.

2. The system of claim 1, wherein the first source of gas and the second source of gas are one source of gas.

3. The water filtration system of claim 1, further comprising a recirculation line having an inlet and an outlet fluidly connected to the regenerative media filter vessel.

4. The water filtration system of claim 1, further comprising a pressure sensor subsystem comprising an inlet pressure sensor and an outlet pressure sensor, configured to measure a differential pressure across the regenerative media filter vessel.

5. The water filtration system of claim 1, further comprising an end use valve positioned on the filtrate line and configured to allow passage of the filtered water to the end use.

6. The water filtration system of claim 1, further comprising a feed valve positioned on the feed line and configured to allow passage of the water to the regenerative media filter vessel.

7. The water filtration system of claim 1, further comprising a first gas valve positioned on the gas line and configured to allow passage of gas to the gas distributor.

8. The water filtration system of claim 1, wherein the gas line is fluidly connectable to the second source of gas and the inflatable bladder, the system further comprising a second gas valve positioned on the gas line and configured to allow passage of gas to the inflatable bladder.

9. The water filtration system of claim 3, further comprising at least one recirculation valve positioned on the recirculation line and configured to allow passage of at least one of the water to be filtered and the filtered water through the recirculation line.

10. The water filtration system of claim 4, further comprising a controller operably connected to the pressure sensor subsystem, the controller configured to direct the water through the regenerative media filter vessel in a first direction for operation in a filtration mode for a first period of time until the pressure sensor subsystem measures the differential pressure in a first predetermined differential pressure range associated with deteriorated operation of the regenerative media filter vessel.

11. The water filtration system of claim 10, wherein the controller is configured to inflate and deflate the inflatable bladder to force water into the regenerative media filter vessel in a cleaning mode responsive to the pressure sensor measuring the differential pressure in the first predetermined differential pressure range for a predetermined number of inflation-deflation cycles sufficient to decrease the differential pressure to be within a second predetermined differential pressure range associated with restored operation of the regenerative media filter vessel.

12. The water filtration system of claim 10, wherein the controller is configured to direct the filtered water through the regenerative media filter vessel in a second direction, opposite the first direction, for reverse recirculation in a cleaning mode responsive to the pressure sensor measuring the differential pressure in the first predetermined differential pressure range for a second period of time sufficient to decrease the differential pressure to be within a second predetermined differential pressure range associated with restored operation of the regenerative media filter vessel.

13. The water filtration system of claim 10, wherein the controller is configured to direct an effective volume of gas from the first source of gas to the gas distributor to produce a plurality of bubbles in an aeration mode responsive to the pressure sensor measuring the differential pressure in the second differential pressure range.

14. The water filtration system of claim 13, wherein the bubbles are generated following the predetermined number of inflation-deflation cycles.

15. The water filtration system of claim 13, wherein the bubbles are generated following the reverse recirculation.

16. The water filtration system of claim 10, wherein the first predetermined differential pressure range is between about 10 psi and about 15 psi.

17. The water filtration system of claim 11, wherein the second predetermined differential pressure range is between about 7 psi and about 12 psi.

18. The water filtration system of claim 13, wherein the effective volume of gas delivered to the gas distributor is a continuous flow.

19. The water filtration system of claim 13, wherein the effective volume of gas delivered to the gas distributor is a pulsed flow.

20. The water filtration system of claim 19, wherein the pulsed flow is random in magnitude, frequency, and/or duration.

21. The water filtration system of claim 13, wherein the gas distributor is configured to produce symmetric bubbles.

22. The water filtration system of claim 13, wherein the gas distributor is configured to produce asymmetric bubbles.

* * * * *